United States Patent
Yamaguchi et al.

(10) Patent No.: US 9,141,893 B2
(45) Date of Patent: Sep. 22, 2015

(54) IMAGE FORMING APPARATUS AND METHOD FOR CONTROLLING THE SAME

(71) Applicants: Akinori Yamaguchi, Osaka (JP); Masayuki Hayashi, Osaka (JP); Hiroaki Ikeda, Osaka (JP); Kunihiro Komai, Osaka (JP); Tatsuya Miyadera, Osaka (JP); Takeshi Shikama, Osaka (JP); Takuhei Yokoyama, Osaka (JP); Yoshinori Shirasaki, Osaka (JP); Motohiro Kawanabe, Osaka (JP)

(72) Inventors: Akinori Yamaguchi, Osaka (JP); Masayuki Hayashi, Osaka (JP); Hiroaki Ikeda, Osaka (JP); Kunihiro Komai, Osaka (JP); Tatsuya Miyadera, Osaka (JP); Takeshi Shikama, Osaka (JP); Takuhei Yokoyama, Osaka (JP); Yoshinori Shirasaki, Osaka (JP); Motohiro Kawanabe, Osaka (JP)

(73) Assignee: RICOH COMPANY, LIMITED, Tokyo (JP)

(*) Notice: Subject to any disclaimer, the term of this patent is extended or adjusted under 35 U.S.C. 154(b) by 70 days.

(21) Appl. No.: 13/782,248

(22) Filed: Mar. 1, 2013

(65) Prior Publication Data

US 2013/0242318 A1   Sep. 19, 2013

(30) Foreign Application Priority Data

Mar. 19, 2012 (JP) .................................. 2012-062534

(51) Int. Cl.
*G06F 15/00* (2006.01)
*G06K 1/00* (2006.01)
*H04N 1/60* (2006.01)
*G06K 15/02* (2006.01)
*G03G 15/00* (2006.01)

(52) U.S. Cl.
CPC ........ *G06K 15/1878* (2013.01); *G03G 15/5058* (2013.01); *G03G 2215/0141* (2013.01)

(58) Field of Classification Search
None
See application file for complete search history.

(56) References Cited

U.S. PATENT DOCUMENTS

| 6,215,512 | B1 | 4/2001 | Imaizumi et al. | |
|---|---|---|---|---|
| 6,862,081 | B2 * | 3/2005 | Soya | 355/407 |
| 2007/0172257 | A1 * | 7/2007 | Matsuda et al. | 399/167 |
| 2008/0043299 | A1 * | 2/2008 | Ikeda | 358/518 |
| 2011/0316955 | A1 * | 12/2011 | Peregrym | 347/198 |

FOREIGN PATENT DOCUMENTS

| JP | 11-272035 | 10/1999 |
|---|---|---|
| JP | 11-352744 | 12/1999 |
| JP | 2001-201896 | 7/2001 |
| JP | 2008-077066 | 4/2008 |
| JP | 2010-256592 | 11/2010 |

* cited by examiner

Primary Examiner — Vincent Rudolph
Assistant Examiner — Michael Burleson
(74) Attorney, Agent, or Firm — Oblon, McClelland, Maier & Neustadt, L.L.P.

(57) ABSTRACT

In the invention, an inclination amount of sensors is reflected in positional deviation correction patterns, and for correcting formation positions of images of various colors, the positional deviation correction patterns are formed on a conveying belt. The positional deviation correction patterns are detected by the sensors. A control unit calculates positional deviation correction amounts based on detection results of the positional deviation correction patterns. Based on the calculated positional deviation correction amounts, the control unit performs calculation for correcting the positional deviation correction patterns, and cancels the inclination amount reflected in the calculation results to obtain final positional deviation correction amounts. Skew correction is performed based on the final positional deviation correction amounts, and thus, the positional deviations are corrected.

13 Claims, 16 Drawing Sheets

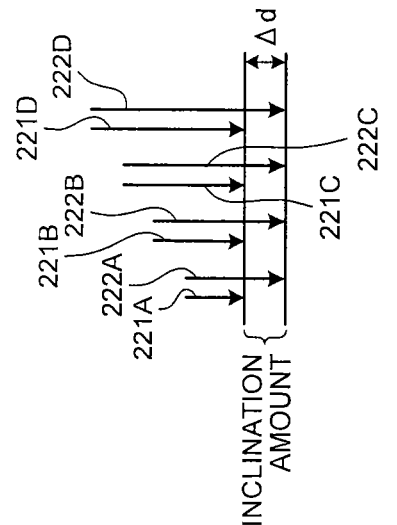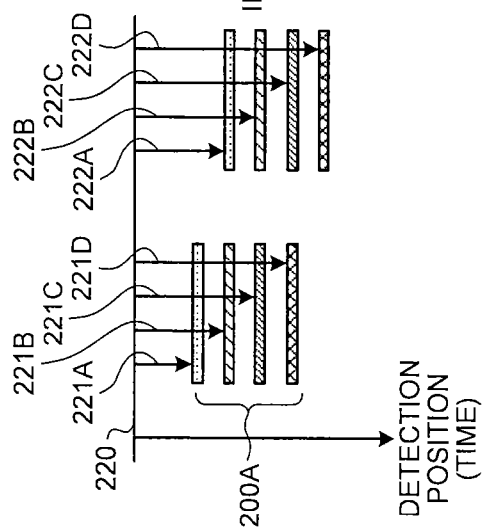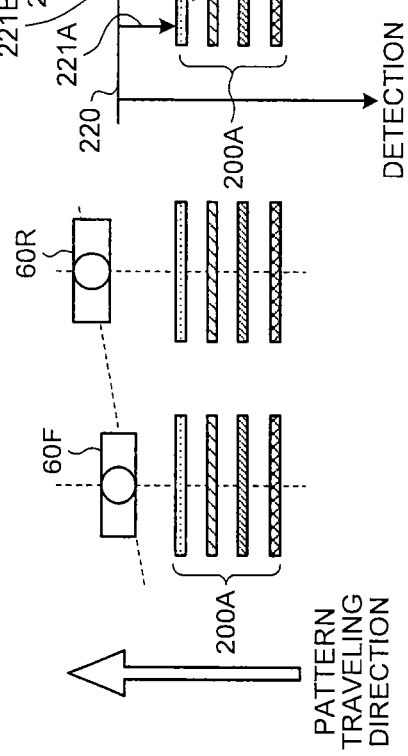

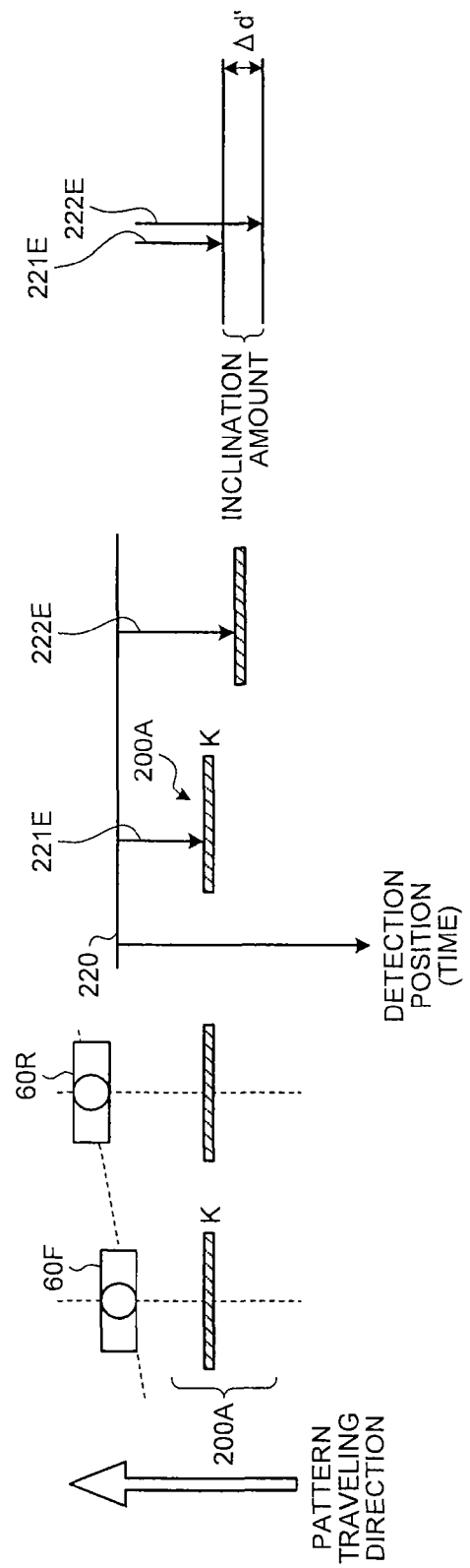

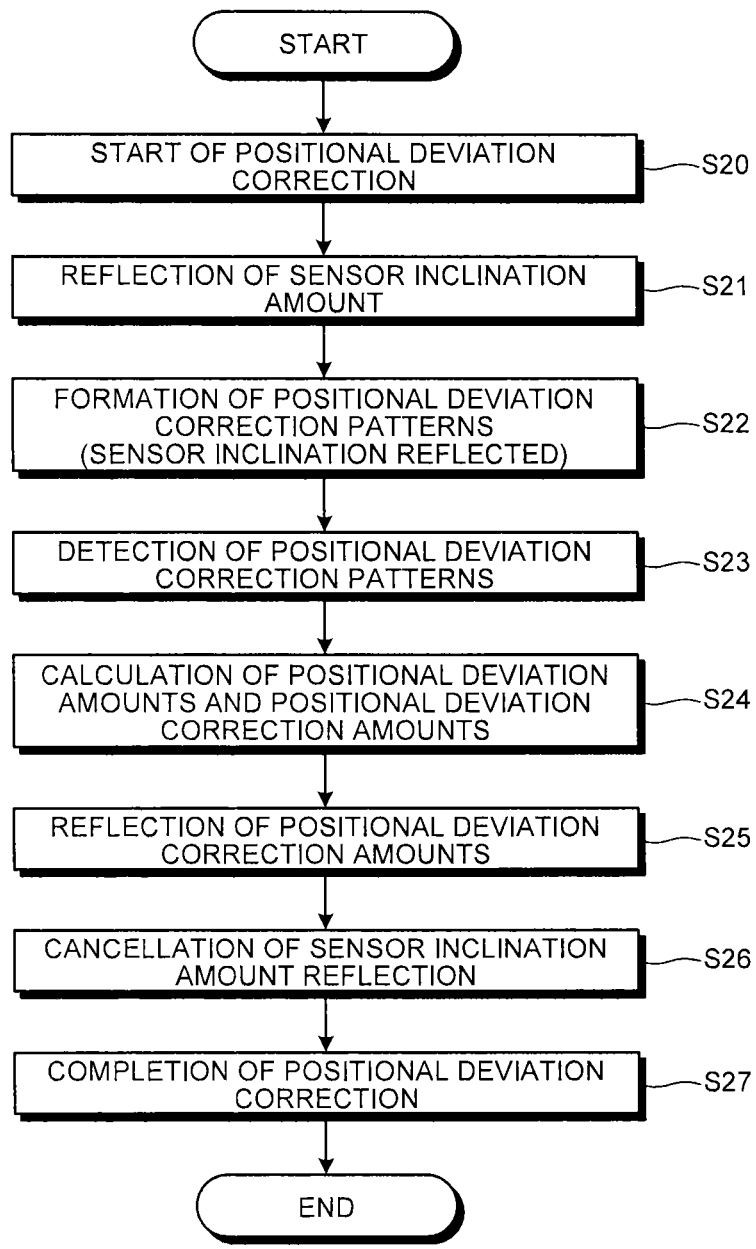

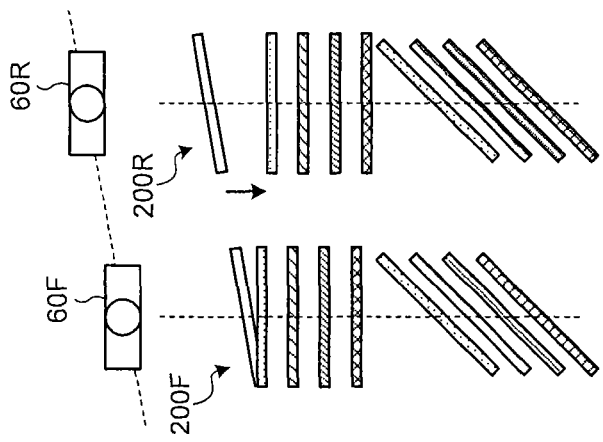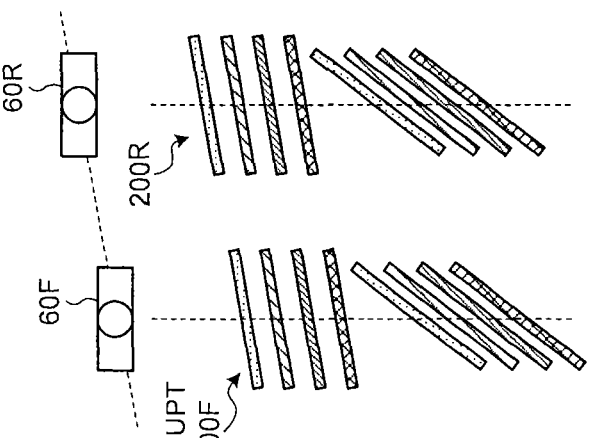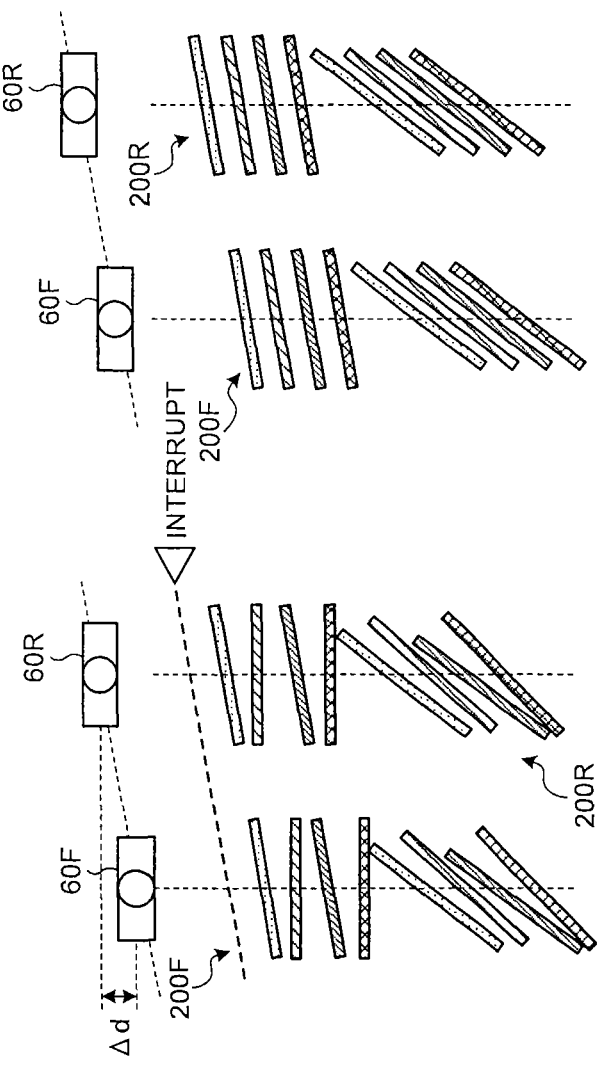

IMAGE FORMING APPARATUS AND METHOD FOR CONTROLLING THE SAME

CROSS-REFERENCE TO RELATED APPLICATIONS

The present application claims priority to and incorporates by reference the entire contents of Japanese Patent Application No. 2012-062534 filed in Japan on Mar. 19, 2012.

BACKGROUND OF THE INVENTION

1. Field of the Invention

The present invention relates to an image forming apparatus that corrects positional deviations of colors by forming positional deviation correction patterns and to a method for controlling the image forming apparatus.

2. Description of the Related Art

Among electrophotographic image forming apparatuses, tandem type image forming apparatuses having a plurality of photosensitive elements for forming images of mutually different colors are commonly used. The tandem type image forming apparatus forms a static latent image on each of the photosensitive elements by optical writing, and transfers a toner image obtained by developing the static latent image onto a printing medium or an intermediate transfer body. The tandem type image forming apparatus performs this transfer operation for each color, and superimposes the toner images of the colors onto the printing medium or the intermediate transfer body to obtain a full-color toner image. If the toner image is transferred onto the intermediate transfer body, the transferred toner image is further transferred from the intermediate transfer body onto the printing medium. The toner image transferred onto the printing medium is fixed to the printing medium to obtain a color image.

In such an image forming apparatus, if transfer positions of the colors are deviated from each other, the toner images of the colors are not properly superimposed, and thus, the image quality of the printed image deteriorates. Therefore, the deviation among the transfer positions of the colors needs to be corrected.

For the electrophotographic image forming apparatus, there is already known, as a method for correcting deviations of transfer positions of colors (hereinafter called as positional deviations for short), a method in which positional deviation correction patterns are formed on a conveying belt for carrying the printing medium or on the intermediate transfer body, and the positional deviations are corrected based on positional information obtained by detecting the positions of the positional deviation correction patterns with sensors.

There is also already known a method in which, when a specified number of positional deviation correction patterns are detected by sensors, an interrupt is generated in a central processing unit (CPU), and the results of the detection are stored in a memory. With this method, a plurality of positional deviation correction patterns can be detected at a high speed and with high accuracy.

For example, Japanese Patent Application Laid-open No. 2008-77066 discloses a technique of making correction processing faster and more efficient by simultaneously forming and detecting a plurality of types of correction patterns. According to Japanese Patent Application Laid-open No. 2008-77066, line detection signals of the positional deviation correction patterns are sampled and stored in a FIFO memory, and, after one set of line rows are detected, the data stored in the FIFO memory is read into a random access memory (RAM) and is subjected to predetermined arithmetic processing. This processing is applied to a plurality of such sets of line rows, and correction data is eventually obtained.

In the method for correcting the positional deviations by the conventional technique using the interrupt in the CPU, it is necessary to set a pattern distance of a part corresponding to the timing of storing detection results in the memory by generating the interrupt larger than pattern distances of the other parts.

For example, consider a case of storing detection results in the memory each time when a specified number of patterns are detected. As such a detection example, an example is given in which specified numbers of first and second patterns are used, and positional deviations are detected in the sub-scanning direction and in the main-scanning direction, respectively. In such a case, an interrupt for memory writing is generated during a period from immediately after the specified number of patterns have been detected until detection of the next pattern begins. Therefore, in order to properly store the detection results in the memory, a predetermined margin period needs to be provided for timing of generating the interrupt.

However, conventionally, in order to deal with cases such as when sensors are inclined with respect to a correct pattern, it has been necessary to set the margin period for the interrupt timing longer than in the case in which the inclination of the sensors or the like is not taken into consideration. There has been a problem that ensuring a longer margin period for the interrupt makes the overall length of patterns longer, and thus requires a longer time for the positional deviation correction processing.

Even Japanese Patent Application Laid-open No. 2008-77066 described above cannot resolve the problem that ensuring a margin for the interrupt part makes the overall length of patterns longer, and thus requires a longer time for the positional deviation correction processing.

SUMMARY OF THE INVENTION

In view of the above description, there is needed to make it possible to perform the positional deviation correction processing in a shorter time.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIGS. 7A to 7C are schematic diagrams for explaining calculation of the inclination amount of the sensors based on detection results of sensor inclination patterns;

FIGS. 8A to 8C are schematic diagrams for explaining calculation of the inclination amount of the sensors based on detection results of sensor inclination patterns;

FIG. 9 is a flow chart of an example illustrating positional deviation correction processing according to the first embodiment;

FIGS. 12A to 12C are schematic diagrams conceptually illustrating the positional deviation correction processing according to the first embodiment;

DETAILED DESCRIPTION OF THE PREFERRED EMBODIMENTS

Embodiments of an image forming apparatus and a method for controlling the image forming apparatus will be described below in detail with reference to the accompanying drawings.

First Embodiment

Figure 1:
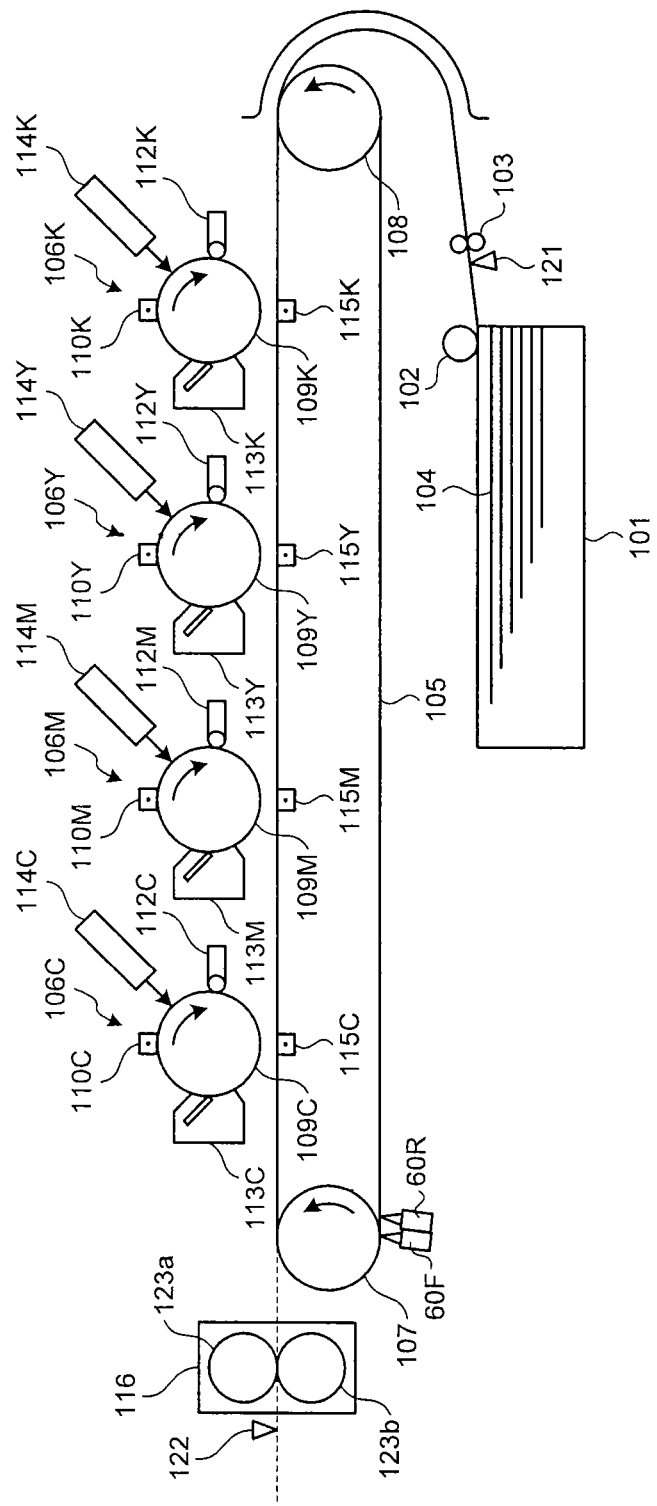
FIG. 1 is a schematic diagram illustrating a configuration of an example of an image forming apparatus according to a first embodiment of the present invention, with a focus on portions to perform image formation.

FIG. 1 illustrates a configuration of an example of the image forming apparatus according to a first embodiment of the present invention, with a focus on portions to perform image formation. The image forming apparatus illustrated in FIG. 1 has a configuration of arranging, along a conveying belt 105 serving as an endless moving unit, image forming units 106C, 106M, 106Y, and 106K that form images having colors of cyan (C), magenta (M), yellow (Y), and black (K), respectively, and is referred to as a so-called tandem type image forming apparatus. The first embodiment is an example in the image forming apparatus using a direct transfer system that directly transfers images from photosensitive drums exposed according to image data to a printing medium.

In the image forming apparatus according to the first embodiment, along the conveying belt 105, the image forming units 106K, 106Y, 106M, and 106C are arranged in this order from the upstream side in the conveying direction of the conveying belt 105 which carries a sheet (printing medium) 104 separately fed by a paper feeding roller 102 and a separation roller 103 from a paper feed tray 101. The image forming units 106K, 106Y, 106M, and 106C have a common internal configuration, with only difference in color of toner images formed thereby.

Specifically, for example, the image forming unit 106K has a photosensitive drum 109K, a charger 110K, a developing unit 112K, a neutralizing unit 113K, and a light emitting diode array (LEDA) head 114K, while having a transfer unit 115K in a position facing the conveying belt 105 on the side opposite to the photosensitive drum 109K.

In the same manner, the image forming units 106Y, 106M, and 106C has a photosensitive drum 109Y, a photosensitive drum 109M, and a photosensitive drum 109C; a charger 110Y, a charger 110M, and a charger 110C; a developing unit 112Y, a developing unit 112M, and a developing unit 112C; a neutralizing unit 113Y, a neutralizing unit 113M, and a neutralizing unit 113C; and an LEDA head 114Y, an LEDA head 114M, and an LEDA head 114C, respectively. The image forming units 106Y, 106M, and 106C also has a transfer unit 115Y, a transfer unit 115M, and a transfer unit 115C in positions facing the conveying belt 105 on the side opposite to the photosensitive drum 109Y, the photosensitive drum 109M, and the photosensitive drum 109C, respectively.

In the description below, in order to avoid complication, the image forming units 106K, 106Y, 106M, and 106C will be represented by the image forming unit 106K.

The conveying belt 105 is an endless belt wound around a rotationally driven driving roller 107 and a driven roller 108. The driving roller 107 is rotationally driven by a driving motor (not illustrated), and the driving motor, the driving roller 107, and the driven roller 108 function as a driving unit that moves the conveying belt 105.

At the time of image formation, the sheet 104 stored in the paper feed tray 101 is fed out by the paper feeding roller 102 sequentially from the top one downward, and, through detection of the leading end of the sheet 104 by a registration sensor 121 for aligning the position of the sheet 104, is fed to the separation roller 103. The sheet 104 is fed out from the separation roller 103 and reaches the conveying belt 105. The sheet 104 is then attached to the conveying belt 105 by an electrostatic adsorption effect, and is carried by the rotationally driven conveying belt 105 to the first image forming unit 106K. Here, a black toner image is transferred onto the sheet 104.

The image forming unit 106K includes the photosensitive drum 109K serving as a photosensitive element, the charger 110K arranged on the circumference of the photosensitive drum 109K, the LEDA head 114K, the developing unit 112K, a photosensitive element cleaner (not illustrated), and the neutralizing unit 113K. The LEDA head 114K is composed of, for example, a number of laser diodes arranged in the main-scanning direction relative to the photosensitive drum 109K so as to emit laser beams in a linear form.

At the time of image formation, the outer circumferential surface of the photosensitive drum 109K is uniformly charged in the dark by the charger 110K, and then is exposed to radiation of light corresponding to image data of color K from the LEDA head 114K to have a static latent image formed thereon. The developing unit 112K visualizes the static latent image with a black toner. With this processing, the black toner image is formed on the photosensitive drum 109K.

Here, when the LEDA head 114K is lit up once, an exposure for one line is made onto the photosensitive drum 109K, and a scan in the main-scanning direction is made once. Rotating the photosensitive drum 109K at a predetermined angular velocity while lighting up the LEDA head 114K at a predetermined period gives exposures of equally spaced lines.

The toner image formed on the photosensitive drum 109K is transferred onto the sheet 104 by the action of the transfer unit 115K in a position (transfer position) where the photosensitive drum 109K comes in contact with the sheet 104 on the conveying belt 105. This transfer forms an image with the black toner on the sheet 104.

The photosensitive drum 109K after finishing the transfer of the toner image is wiped by the photosensitive element cleaner to remove unnecessary toner remaining on the outer circumferential surface, and then, after being neutralized by the neutralizing unit 113K, stands by for the next image formation.

The sheet 104 that has had the black toner image transferred thereto in the image forming unit 106K as described above is carried by the conveying belt 105 to the next image forming unit 106Y. In the image forming unit 106Y, a yellow toner image is formed on the photosensitive drum 109Y by a process similar to the above-described image forming process in the image forming unit 106K, and the toner image is transferred in an overlapped manner on the black image formed on the sheet 104. The sheet 104 is further carried to the next image forming units 106M and 106C, successively, and, by similar processes, a magenta toner image formed on the photosensitive drum 109M and a cyan toner image formed on the photosensitive drum 109C are successively transferred in an overlapped manner on the sheet 104. In this manner, a full color image is formed on the sheet 104.

The sheet 104 that has the full color image formed thereon is separated from the conveying belt 105 and fed to a fixing unit 116. The fixing unit 116 includes a fixing roller 123a and a pressing roller 123b in contact with the fixing roller 123a, and is configured so that the pressing roller 123b applies a predetermined pressure to the fixing roller 123a. The fixing roller 123a is controlled to be heated at a constant temperature by a heater (not illustrated). At least one of the fixing roller 123a and the pressing roller 123b is rotationally driven at an angular velocity corresponding to a conveying speed of the conveying belt 105.

In the fixing unit 116, the sheet 104 is heated and pressurized while passing between the fixing roller 123a and the pressing roller 123b. The toner images of the various colors on the sheet 104 are fixed to the sheet 104 by this heating and pressurization. The sheet 104 ejected from the fixing unit 116 is discharged through detection of the leading end thereof by a discharging sensor 122 that detects existence of the sheet 104, for example, by using reflection of light.

The image forming apparatus according to the first embodiment forms positional deviation correction patterns on the conveying belt 105 in order to correct positional deviations of the formed images. In order to detect the positional deviation correction patterns formed on the conveying belt 105, sensors 60F and 60R are provided on the downstream side, in the driving direction of the conveying belt 105, of the photosensitive drums 109C, 109M, 109Y, and 109K.

The sensors 60F and 60R are arranged in a predetermined arrangement direction. For example, the sensors 60F and 60R are arranged so as to be aligned in a direction perpendicular to the driving direction of the conveying belt 105. The sensors 60F and 60R are also arranged as near as possible to the photosensitive drum 109C on the most downstream side in the driving direction of the conveying belt 105 so as to be capable of detecting the positional deviation correction patterns earlier.

Figure 2:
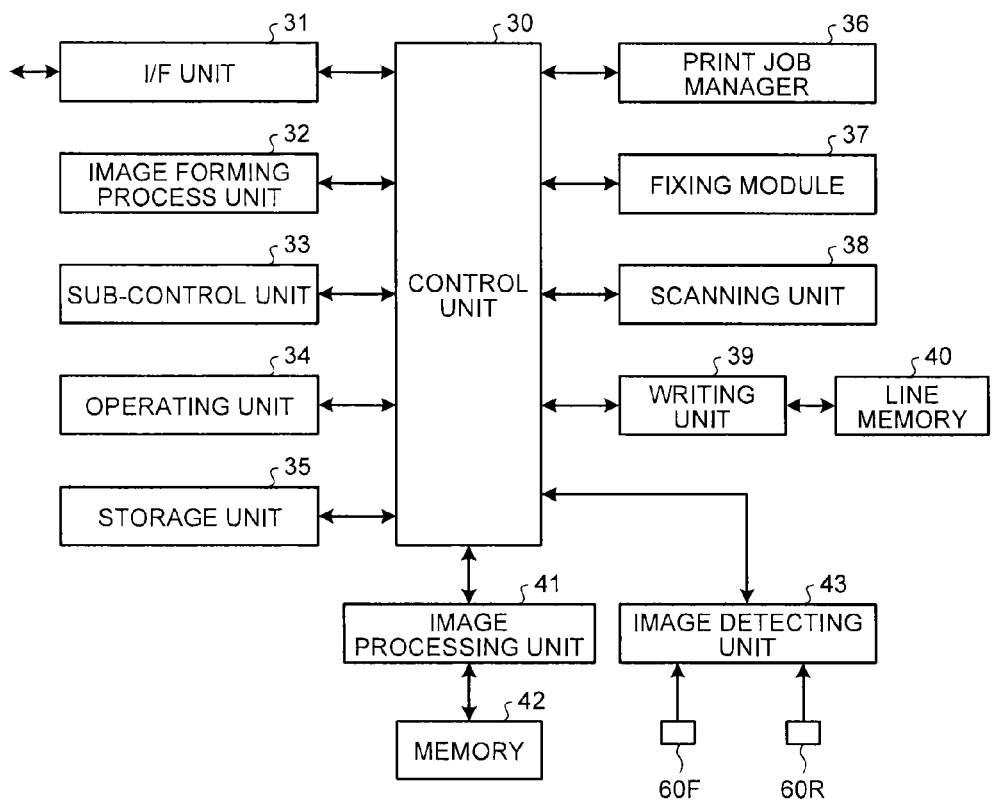
FIG. 2 is a functional block diagram illustrating a configuration of an example for controlling the image forming apparatus according to the first embodiment.

FIG. 2 is a functional block diagram illustrating a configuration of an example for controlling the image forming apparatus according to the first embodiment. The image forming apparatus has a control unit 30, an interface (I/F) unit 31, an image forming process unit 32, a sub-control unit 33, an operating unit 34, a storage unit 35, a print job manager 36, a fixing module 37, a scanning unit 38, a writing unit 39, an image processing unit 41, and an image detecting unit 43.

The control unit 30 includes, for example, a central processing unit (CPU), a read-only memory (ROM) and a random access memory (RAM), and, according to a program stored in advance in the ROM, controls the entire image forming apparatus using the RAM as a work memory. The control unit 30 also has an arbitration unit that arbitrates data transfer on a bus, and thus controls the data transfer among the above-mentioned units.

The I/F unit 31 is connected to external devices such as a personal computer, and controls communication with the external devices in accordance with instructions of the control unit 30. For example, the I/F unit 31 receives a print request or the like sent from the external devices, and sends it to the control unit 30. The print job manager 36 manages the order and the like of printing with respect to the print request (print job) given to the image forming apparatus.

The image processing unit 41 to which a memory 42 is connected once stores, for example, image data received from the sub-control unit 33 in the memory 42, and applies predetermined image processing to the image data stored in the memory 42. The image data processed by the image processing is stored again in the memory 42. The image processing unit 41 can also generate predetermined image data in accordance with an instruction of the control unit 30.

The sub-control unit 33 that has, for example a CPU controls the units illustrated in FIG. 1 in response to the print request, and sends the image data for printing received from the external devices via the I/F unit 31 to the image processing unit 41. The sub-control unit 33 also receives the image data processed by the image processing or the generated image data from the image processing unit 41, and sends the image data to the writing unit 39 to be described below.

The writing unit 39 receives the image data from the sub-control unit 33, and controls the writing, that is, the exposure according to the image data onto the photosensitive drums 109C, 109M, 109Y, and 109K by the LEDA heads 114C, 114M, 114Y, and 114K in the above-described image forming units 106C, 106M, 106Y, and 106K.

The writing unit 39 is connected with a line memory 40 that can store, in units of lines, a plurality of lines of image data. For example, the writing unit 39 stores the image data received from the sub-control unit 33 in the line memory 40 in units of lines. The writing unit 39 can be provided with an image processing unit so as to apply, at this time, predetermined image processing to the image data to be stored in the line memory 40.

In accordance with the control by the control unit 30, the writing unit 39 reads out the image data in units of lines from the line memory 40, and, based on the read-out image data, controls lighting of the LEDA heads 114C, 114M, 114Y, and 114K in units of pixels to write the image data onto the photosensitive drums 109C, 109M, 109Y, and 109K.

The image forming process unit 32 includes the above-described image forming units 106C, 106M, 106Y, and 106K, and performs processing such as development and transfer of the static latent images written by the writing unit 39 on the photosensitive drums 109C, 109M, 109Y, and 109K.

The image detecting unit 43 is connected with the sensors 60F and 60R, and, based on outputs of the sensors 60F and 60R, performs detection processing of the positional deviation correction patterns formed on the conveying belt 105 by the writing unit 39 in accordance with the control unit 30. The detection results of the positional deviation correction patterns are sent to the control unit 30. Based on the detection results of the positional deviation correction patterns, the control unit 30 controls the writing unit 39, and thus performs positional deviation correction processing.

The storage unit 35 stores therein information indicating a state of the image forming apparatus at a certain point of time. For example, the detection results of the positional deviation correction patterns are stored in the storage unit 35 in response to an interrupt generated by the control unit 30. The operating unit 34 has operating elements that accept user operations and a display unit that displays the state of the image forming apparatus for the user.

The fixing module 37 has the above-described fixing unit 116 and a configuration for controlling the fixing unit 116, and applies heat and pressure to the sheet 104 onto which the toner image is transferred by the image forming process unit 32, thus fixing the toner image onto the sheet 104.

The scanning unit 38 reads printed information on a sheet and converts the information into electrical signals, thus achieving a so-called scanner function. The electrical signals that the scanning unit 38 has obtained by reading the printed information and outputs are sent to the control unit 30. The scanning unit 38 and a communication unit (not illustrated) enable the image forming apparatus to function as an MFP that implements a printer function, the scanner function, a copy function, and a facsimile function in one housing. Note that the scanning unit 38 can be omitted.

Example of Positional Deviation Correction Patterns

Figure 3:
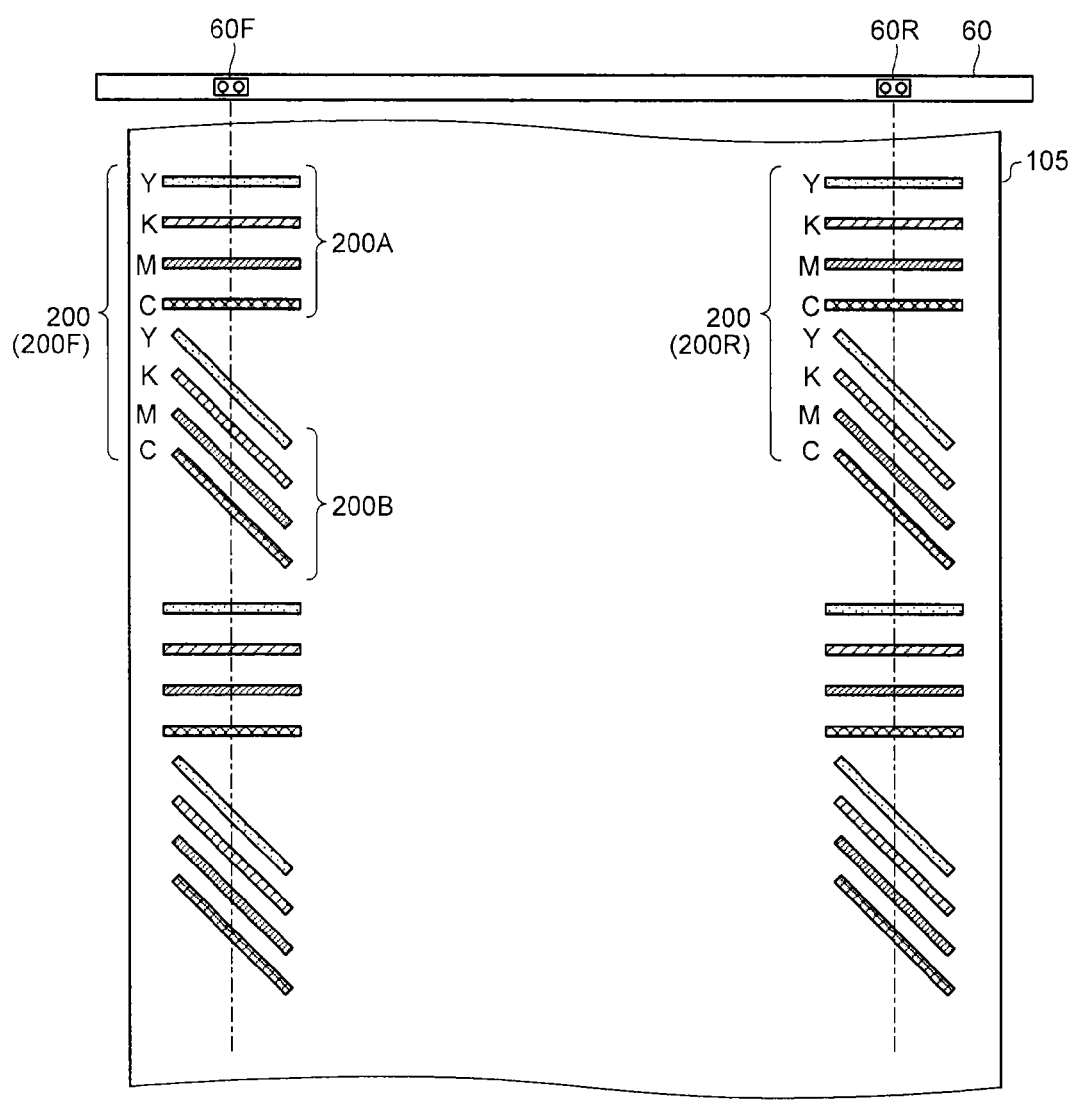
FIG. 3 is a schematic diagram illustrating an example of positional deviation correction patterns applicable to the first embodiment.

FIG. 3 illustrates an example of the positional deviation correction patterns applicable to the first embodiment. In the first embodiment, ladder patterns 200, 200, . . . as illustrated in FIG. 3 are formed on the conveying belt 105. Each ladder pattern 200 is formed by combining a transverse line pattern 200A in which lines having colors of Y, K, M, and C are arranged at even intervals in parallel with the main-scanning direction and a slanted line pattern 200B in which lines having the corresponding colors are arranged at even intervals at an angle of 45 degrees with respect to the main-scanning direction.

In the description below, each of the lines having the corresponding colors and constituting the ladder pattern 200 is called a toner mark. In other words, the ladder pattern 200 is a positional deviation correction pattern in which a collection of a plurality of toner marks forms a certain pattern.

As illustrated in FIG. 3, a plurality of rows of such ladder patterns 200 spaced in the main-scanning direction, that is, in the width direction (in this example, two rows at both ends) are formed on the conveying belt 105. For example, in accordance with an instruction of the control unit 30, the image processing unit 41 generates image data for forming the ladder pattern 200 and stores the image data in the memory 42.

Based on the image data stored in the memory 42, the control unit 30 controls the image forming process unit 32 and the writing unit 39 to form static latent images of the ladder patterns 200 on the photosensitive drums 109C, 109M, 109Y, and 109K. The static latent images are developed to be toner images of the ladder patterns 200, which in turn are transferred onto the conveying belt 105.

At this time, a plurality of such ladder patterns 200 are formed in each of the rows toward the sub-scanning direction, that is, toward the running direction of the conveying belt 105. Assuming one ladder pattern 200 as one set, eight sets of the ladder patterns 200, for example, are formed in each row.

A sensor unit 60 has the sensor 60F that detects the ladder pattern 200 at the left end in FIG. 3 and the sensor 60R that detects the ladder pattern 200 at the right end in FIG. 3, each of the sensors 60F and 60R corresponding to each row of the ladder pattern 200. Each of the sensors 60F and 60R has a light source that emits a light beam toward an object to be detected and an optical sensing element that detects light from the object to be detected. More specifically, a general-purpose driving reflective photo-interrupter can be used as each of the sensors 60F and 60R.

In the description below, the ladder pattern 200 corresponding to the sensor 60F will be described as ladder pattern 200F, and the ladder pattern 200 corresponding to the sensor 60R will be described as ladder pattern 200R, as appropriate. Where it is not necessary to distinguish between the ladder pattern 200F and the ladder pattern 200R, the name "ladder pattern 200" will be used to represent the description.

Next, a method for an example of the positional deviation correction applicable to the first embodiment will be described. In the present embodiment, correction values by which color shift correction is to be made are calculated by measuring distances between the toner marks constituting the transverse line pattern 200A of the ladder pattern 200 and distances between the toner marks of the transverse line pattern 200A and the corresponding toner marks of the slanted line pattern 200B.

In this example, the ladder patterns 200 are repeatedly formed along the sub-scanning direction at both ends in the main-scanning direction of the conveying belt 105, thus constituting two positional deviation correction pattern rows. The length of one of the ladder patterns 200 is defined as the length from a toner mark at the head of the ladder pattern 200 (toner mark of color Y of the transverse line pattern 200A) to a toner mark at the head of another of the ladder patterns 200 arranged next to the ladder pattern 200. The positional deviation correction pattern rows constituted by the ladder patterns 200 are detected by the sensors 60F and 60R, and the color shift correction processing is performed.

In the ladder patterns 200, for example, detection results of the toner marks constituting the transverse line pattern 200A and the slanted line pattern 200B detected by the sensors 60F and 60R are sampled at constant sampling intervals, and thus, time intervals at which the toner marks of the transverse line pattern 200A and the slanted line pattern 200B are detected are measured. The distances between the toner marks constituting the transverse line pattern 200A and the slanted line pattern 200B can be obtained by multiplying the measured time intervals by a known speed of the conveying belt 105. The deviation amounts can be obtained by measuring distances between toner marks having the same color among those constituting the transverse line pattern 200A and the slanted line pattern 200B and by comparing the distance with respect to each color with those with respect to other colors.

Figure 4:
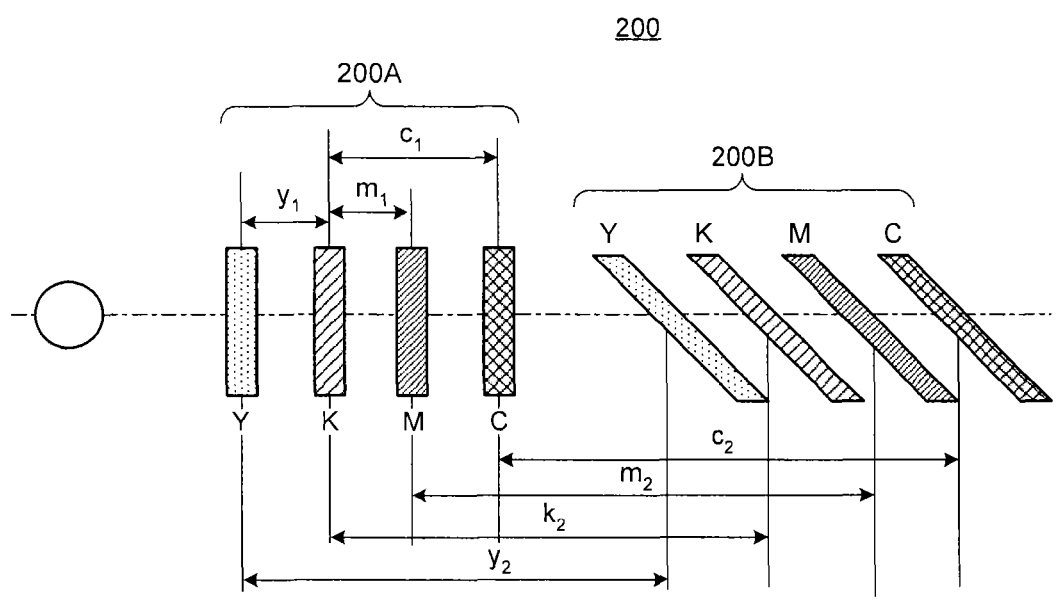
FIG. 4 is a schematic diagram for more specifically explaining detection of positional deviations.

The detection of positional deviation will be more specifically described using FIG. 4. In order to calculate the positional deviations in the sub-scanning direction, the transverse line pattern 200A is used, and pattern distances ($y_1$, $m_1$, and $c_1$) between color K serving as a reference color and the other colors Y, M, and C, respectively, are measured. Then, each of the measurement results is compared with an ideal distance for each color relative to the reference color, and thus, the positional deviations in the sub-scanning direction can be calculated. It is conceivable to store, as the ideal distances, values measured in advance at an adjustment before shipment in the ROM (not illustrated) or the like.

In order to calculate the positional deviations in the main-scanning direction, the distance ($y_2$, $k_2$, $m_2$, or $c_2$) between the toner marks of the transverse line pattern 200A and the corresponding toner marks of the slanted line pattern 200B are measured with respect to all of the colors. The toner marks of the slanted line pattern 200B have an angle of 45 degrees with respect to the main-scanning direction. Accordingly, the positional deviation amounts in the main-scanning direction of the colors Y, M, and C are defined as the differences between the measured distances between the reference color (color K) and the other colors Y, M, and C. For example, the color shift amount of color Y in the main-scanning direction is obtained as $k_2-y_2$. In this manner, the positional deviation amounts in the sub-scanning direction and in the main-scanning direction can be obtained by using the ladder patterns 200.

The detection processing of the positional deviation amounts as described above can be performed by using, for example, at least one of the ladder patterns 200. The positional deviation correction processing can be more accurately performed by using a plurality of such ladder patterns 200 to detect the positional deviation amount with respect to each of the colors. For example, it is conceivable to calculate the positional deviation amount each of the colors by applying statistical processing such as mean value processing to the positional deviation amounts calculated using the ladder patterns 200.

In addition, by using the sensors 60F and 60R located in different positions in the main-scanning direction to perform the above-described detection processing of the positional deviation amounts, it is possible to detect components in the main-scanning direction and in the sub-scanning direction of each of the deviation amounts. For example, a skew component can be obtained by calculating a difference between the positional deviation amounts in the sub-scanning direction detected by the sensors 60F and 60R.

Based on the positional deviation amounts calculated in the above-described manner, the positional deviation correction can be performed by a method such as access control to the line memory 40 in the writing unit 39, deformation of an image by the image processing in the image processing unit 41, or physically inclining each of the LEDA heads 114C, 114M, 114Y, and 114K.

Not limited to these methods, the positional deviation correction can also be performed by controlling, based on the positional deviation amounts, the lighting of the LEDA heads 114C, 114M, 114Y, and 114K for each pixel, and thus by controlling positions and times of optical writing to the photosensitive drums 109C, 109M, 109Y, and 109K for each pixel.

Obtaining Sensor Inclination Amount

Next, the positional deviation correction processing according to the first embodiment will be described. In the first embodiment, inclination of the sensors 60F and 60R is obtained in advance of the positional deviation correction processing. Note that the expression "inclination of the sensors 60F and 60R" refers to an inclination of a line connecting the sensors 60F and 60R with respect to the direction perpendicular to the driving direction of the conveying belt 105.

In the case of the positional deviation correction processing, the above-described ladder patterns 200 used as the positional deviation correction patterns are formed so as to reflect the obtained inclination of the sensors 60F and 60R. Next, the ladder patterns 200 reflecting the inclination are detected by the sensors 60F and 60R, and correction amounts of the positional deviation correction are obtained based on the detection results. Then, the obtained correction amounts are reflected to obtain final correction amounts of the positional deviation correction so as to turn back the inclination of the sensors 60F and 60R, and the positional deviation correction is performed.

Figure 5A:
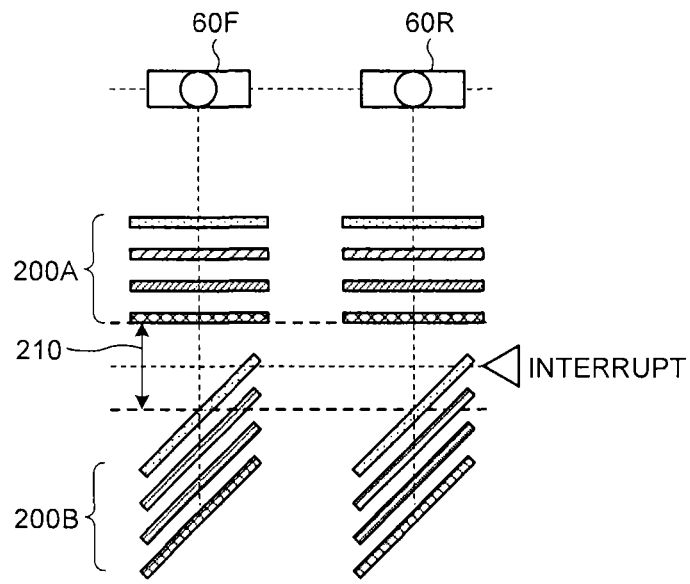
FIGS. 5A and 5B are schematic diagrams for schematically explaining a margin for the positional deviation correction patterns.
Figure 5B:
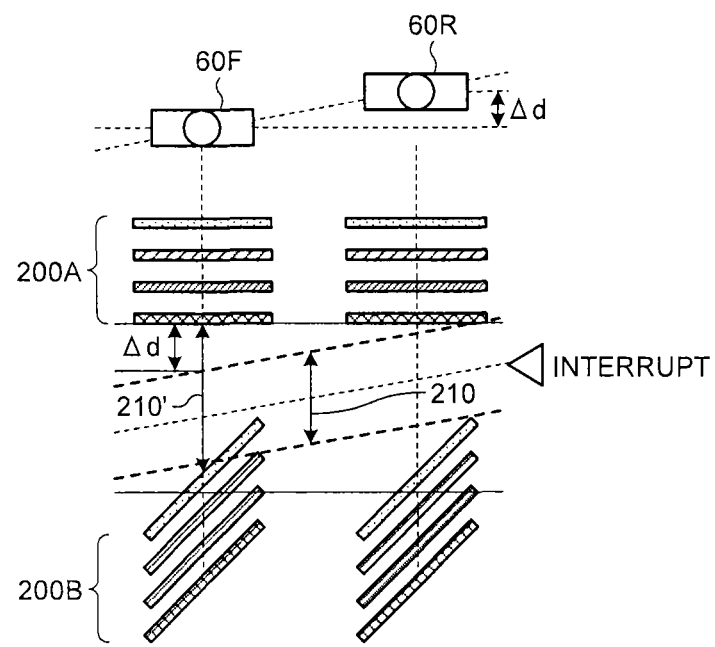

A margin for the positional deviation correction patterns will be schematically described using FIGS. 5A and 5B. Note that the conveying belt 105 is assumed to advance upward in FIGS. 5A and 5B.

Processing of storing the detection results detected by the sensors 60F and 60R in the memory (such as the storage unit 35) is performed, for example, as follows. As described above, the positional deviation correction in the sub-scanning direction is completed by using only the detection results of the transverse line pattern 200A. In contrast, the positional deviation correction in the main-scanning direction uses the detection results of the transverse line pattern 200A and the detection results of the slanted line pattern 200B. For that reason, the detection results of the transverse line pattern 200A need to be stored in the memory during a period from when the detection of the transverse line pattern 200A is finished until the detection of the slanted line pattern 200B begins. At this time, in order to properly store the detection results in the memory, a predetermined margin period is provided for an interrupt for the control unit 30 to store the detection results in the memory.

FIG. 5A illustrates an example in which no inclination of the sensors 60F and 60R is present. In this case, the rearmost toner marks of the transverse line patterns 200A in the rows of the sensors 60F and 60R are apart from the sensors 60F and 60R, respectively, by the same distance as each other. Therefore, the rearmost toner marks of the transverse line patterns 200A are detected by the sensors 60F and 60R substantially at the same time. An example of the margin period in this case is illustrated as a margin distance 210 that is a distance by which the conveying belt 105 advances during the margin period.

FIG. 5B illustrates an example in which an inclination of the sensors 60F and 60R is present. In this example, the sensor 60R is arranged so as to be shifted toward the driving direction of the conveying belt 105 by a distance Δd relative to the sensor 60F. Consequently, the sensor 60R detects the rearmost toner mark of the transverse line pattern 200A after the conveying belt 105 has advanced by the distance Δd relative to the sensor 60F. In other words, the sensor 60F detects a toner mark at the head of the slanted line pattern 200B earlier than the sensor 60R by a period during which the conveying belt 105 advances by the distance Δd. Accordingly, a margin distance 210' in this case is set to a distance obtained by adding the distance Δd to the margin distance 210 mentioned above. This setting prevents the interrupt from being generated before the sensor 60R detects the rearmost toner mark of the transverse line pattern 200A.

Figure 6:
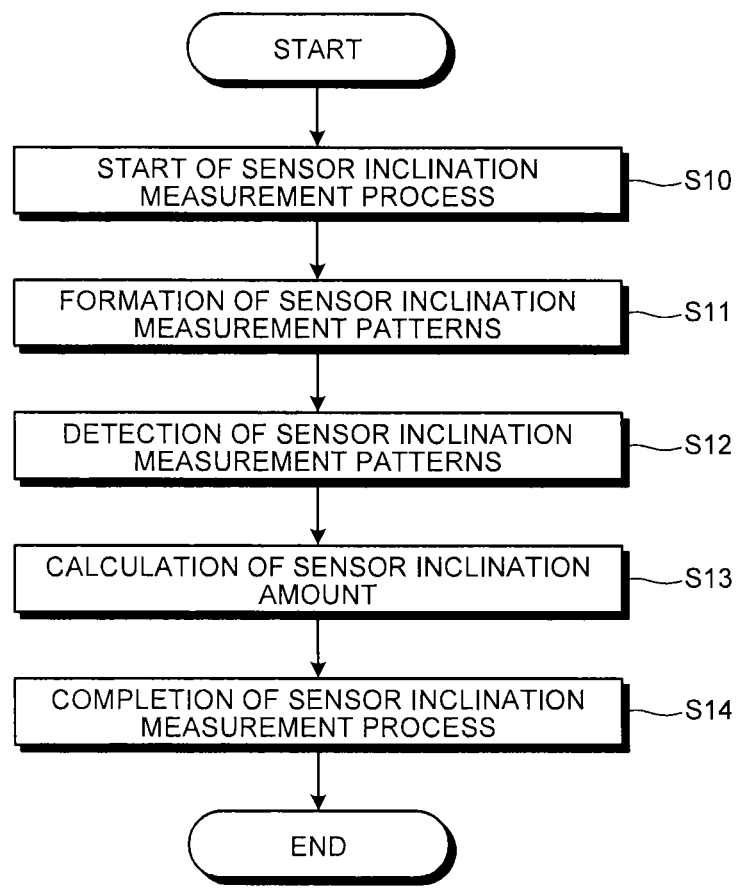
FIG. 6 is a flow chart illustrating processing of an example of obtaining an inclination amount of sensors, according to the first embodiment.

FIG. 6 is a flow chart illustrating processing of an example of obtaining the inclination amount of the sensors 60F and 60R, according to the first embodiment. After the inclination measurement by the sensors 60F and 60R is started at Step S10, the control unit 30 controls, at next Step S11, to form, on the conveying belt 105, sensor inclination measurement patterns for measuring the sensor inclination. For example, the transverse line patterns 200A out of the ladder patterns 200 can be used as the sensor inclination measurement patterns. Patterns consisting of any one color can also be used, out of the transverse line patterns 200A.

Next, at Step S12, the conveying belt 105 is driven, and the sensors 60F and 60R detect the sensor inclination measurement patterns formed at Step S11. After the sensor inclination measurement patterns are detected, the control unit 30 calculates, at next Step S13, the inclination amount of the sensors 60F and 60R based on the detection results. Then, the calculated inclination amount is stored, for example, in the storage unit 35, and the sensor inclination measurement process is terminated (Step S14).

The process of obtaining the inclination amount of the sensors 60F and 60R illustrated in the flowchart of FIG. 6 is performed in advance, for example, at shipment of the image forming apparatus. Not limited to this timing, the process may be performed each time when the image forming apparatus is started, or may be performed at intervals of a predetermined period of use of the image forming apparatus. The inclination amount may obviously be calculated each time when the positional deviation correction processing is performed.

Description will be made, using FIGS. 7A to 7C and 8A to 8C, of the detection of the sensor inclination patterns and the calculation of the inclination amount of the sensors based on the detection results, performed at Steps S12 and S13 described above. FIGS. 7A to 7C illustrate an example in which the transverse line patterns 200A are used without change as the sensor inclination measurement patterns. As illustrated in FIG. 7A, the transverse line patterns 200A are formed on the conveying belt 105, and the sensors 60F and 60R detect the transverse line patterns 200A.

A predetermined time is assumed as a starting point, and periods of time from the starting point until patterns included in the transverse line patterns 200A are detected are measured with respect to each of the sensors 60F and 60R. In the example of FIG. 7B, it is assumed that, with respect to the toner marks included in the transverse line patterns 200A, the sensor 60F measures times 221A, 221B, 221C, and 221D from a reference point 220, and the sensor 60R measures times 222A, 222B, 222C, and 222D from the reference point 220.

At Step S13, differences are calculated with respect to the respective toner mark measurement results obtained by the sensors 60F and 60R, and an average of the calculated differences is obtained as the inclination amount $\Delta d$ of the sensors 60F and 60R. Specifically, as illustrated in FIG. 7C, with respect to the measurement results of the patterns corresponding to the sensors 60F and 60R, the differences are calculated between the times 221A and 222A, between the times 221B and 222B, between the times 221C and 222C, and between the times 221D and 222D, and the average value of the calculated differences is obtained and converted into a distance to obtain the inclination amount $\Delta d$.

FIGS. 8A to 8C illustrate an example in which only one of the toner marks (such as the toner mark of color K) among those of the transverse line pattern 200A is used as one of the sensor inclination measurement patterns. As illustrated in FIG. 8A, the toner marks of color K among those of the transverse line patterns 200A are formed on the conveying belt 105, and the sensors 60F and 60R detect the toner marks of color K.

In this case, as illustrated in FIG. 8B, a time 221E is obtained as a result of measurement by the sensor 60F relative to the predetermined time serving as the starting point, and a time 222E is obtained as a result of measurement by the sensor 60R. At Step S13, the difference between the results of measurement by the sensors 60F and 60R is calculated. In this example, the sensors 60F and 60R obtain the single measurement results, the time 221E and the time 222E, respectively, and therefore, as illustrated in FIG. 8C, the difference between the these measurement results is obtained and converted into a distance to obtain the an inclination amount $\Delta d'$.

Positional Deviation Correction Processing

FIG. 9 is a flow chart of an example illustrating the positional deviation correction processing according to the first embodiment. After the positional deviation correction processing is started at Step S20, the control unit 30 reflects, at Step S21, the inclination amount $\Delta d$ of the sensors 60F and 60R obtained as described using FIG. 6 in the positional deviation correction patterns, and forms the positional deviation correction patterns on the conveying belt 105 (Step S22).

Figure 10A:
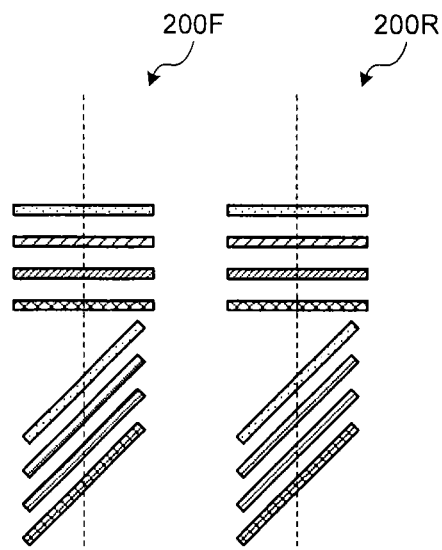
FIGS. 10A and 10B are schematic diagrams for schematically explaining formation of the positional deviation correction patterns reflecting the inclination amount Δd.
Figure 10B:
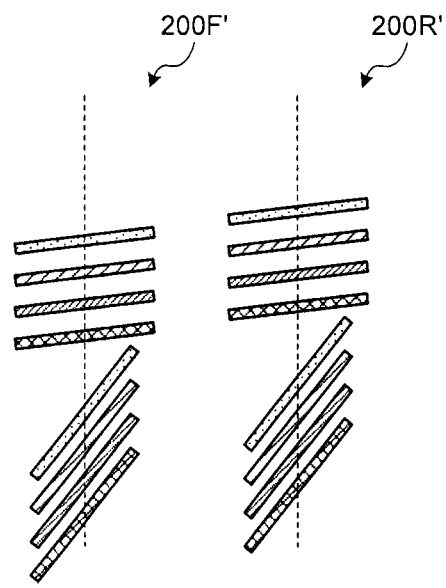

Schematic description will be made, using FIGS. 10A and 10B, of the formation of the positional deviation correction patterns reflecting the inclination amount $\Delta d$. The control unit 30 inclines each of the ladder patterns 200F and 200R used as the positional deviation correction patterns illustrated in FIG. 10A by the inclination amount $\Delta d$ to form each of ladder patterns 200F' and 200R' illustrated in FIG. 10B. More specifically, the control unit 30 forms the ladder patterns 200F and 200R so that each of the toner marks in each of the ladder patterns 200F and 200R is inclined corresponding to the inclination amount $\Delta d$, and so that the ladder patterns 200F and 200R differ in position from each other by the inclination amount $\Delta d$ in the driving direction of the conveying belt 105. Using a skew correction function of positional deviation correction control makes it possible to form the ladder patterns 200 inclined by the inclination amount $\Delta d$ such as described above.

At next Step S23, the sensors 60F and 60R detect the positional deviation correction patterns formed on the conveying belt 105 so as to reflect the inclination amount $\Delta d$ at Step S22. The results of the detection are stored, for example, in the storage unit 35 by the control unit 30. After predetermined sets of the inclination amount reflecting patterns are detected, the control unit 30 calculates, based on the detection results, the positional deviation amounts and the positional deviation correction amounts for correcting the positional deviation amounts at Step S24.

At next Step S25, the control unit 30 once performs the positional deviation correction processing based on the positional deviation correction amounts calculated at Step S24. Based on the positional deviation correction amounts calculated at Step S24, the control unit 30 performs, for example, calculation for correcting the positional deviation correction patterns (in this case, the inclination amount reflecting patterns). Then, at next Step S26, the control unit 30 cancels the inclination amount $\Delta d$ reflected in the calculation results at Step S24 to obtain the final positional deviation correction amounts. In other words, an inclination amount ($-\Delta d$) is reflected into the calculation results obtained at Step S24.

After the final positional deviation correction amounts are obtained at Step S26, the positional deviation correction processing is completed (Step S27). Based on the final positional deviation correction amounts, the control unit 30 performs the skew correction using the skew correction function. Thus, the positional deviations of each of the colors can be corrected while eliminating effects of the inclination of the sensors 60F and 60R.

Figure 13:
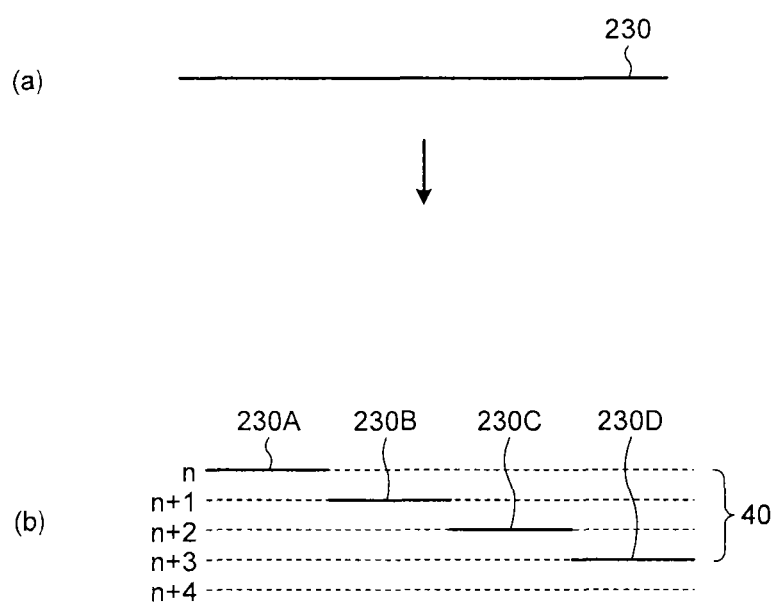
FIG. 13 is a schematic diagram for explaining skew correction using a line memory.

The above-described processes according to the flow chart of FIG. 9 will be described in more detail using FIGS. 11 to 13. In the description below, with respect to the sensors 60F and 60R, the inclination amount $\Delta d$ is assumed to have been detected in advance by the processing of FIG. 6.

Figure 11:
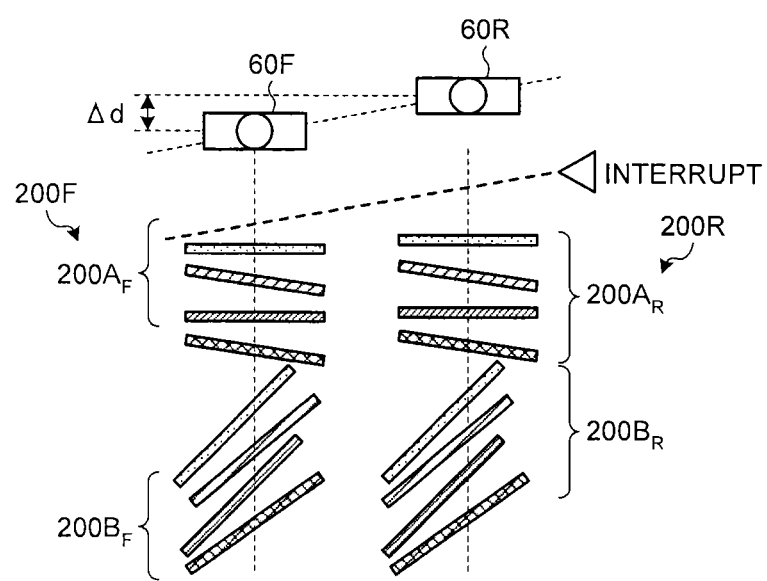
FIG. 11 is a schematic diagram illustrating an example of positional deviation correction patterns formed in a state in which the first embodiment is not applied.

FIG. 11 illustrates an example of the positional deviation correction patterns (ladder patterns 200F and 200R) formed on the conveying belt 105 in a state in which the first embodiment is not applied. In the state in which the first embodiment is not applied, as illustrated, in each of the transverse line pattern 200A and the slanted line pattern 200B of each of the ladder patterns 200F and 200R, the toner marks in colors C, M, Y, and K are formed, for example, so as to be nonparallel with each other and deviated in position from each other.

FIGS. 12A to 12C conceptually illustrate the above-described processes of the flow chart of FIG. 9 using the positional deviation correction patterns. FIG. 12A illustrates an example of the positional deviation correction patterns (ladder patterns 200F and 200R) formed so as to reflect the inclination amount $\Delta d$ of the sensors 60F and 60R at Step S22. For example, the ladder patterns 200F and 200R illustrated in FIG. 11 are formed in a state of being inclined as a whole by the inclination amount Δd relative to a direction perpendicular to the driving direction of the conveying belt 105.

In other words, each of the ladder pattern 200F that is the positional deviation correction pattern corresponding to the sensor 60F and the ladder pattern 200R that is the positional deviation correction pattern corresponding to the sensor 60R is inclined by the inclination amount Δd. The ladder patterns 200F and 200R are also formed so as to differ in position from each other by the inclination amount Δd in the driving direction of the conveying belt 105.

The skew correction function applied to the positional deviation correction control can be used as a method for reflecting the inclination amount Δd in the ladder patterns 200F and 200R. The skew correction can be performed, for example, by using the access control to the line memory 40 so as to shift the writing of the image data into the line memory 40 corresponding to the inclination amount Δd.

The skew correction by use of the line memory 40 will be described using FIG. 13. For example, an image of the ladder patterns 200F and 200R is generated in the control unit 30, then is supplied to the writing unit 39, and is written into the line memory 40 in units of lines. The line memory 40 is assumed to be capable of storing therein a plurality of lines, and also capable of being addressed in units of lines.

For example, as illustrated in FIG. 13(a), a piece of image data 230 in units of lines in the image constituting the ladder patterns 200F and 200R is divided into a plurality of pieces of image data 230A, 230B, 230C, and 230D corresponding to the inclination amount Δd. Then, each piece of the divided image data 230A, 230B, 230C, and 230D is written at a storage address successively shifted such as the n-th line address, the (n+1)-th line address, and so on in the line memory 40.

When the photosensitive drums 109C, 109M, 109Y, and 109K are exposed by the LEDA heads 114C, 114M, 114Y, and 114K, the writing unit 39 reads out the image data in units of lines from the line memory 40 according to addresses as usual. As a result, the ladder patterns 200F and 200R reflecting the inclination amount Δd can be formed.

Although, here, the inclination amount Δd is reflected in the ladder patterns 200F and 200R by using the access control when the image data is written into the line memory 40, the present invention is not limited to this example. For example, the inclination amount Δd can also be reflected in the ladder patterns 200F and 200R by performing the same access control when the image data is read out from the line memory 40.

Coming back to the description of FIGS. 12A to 12C, the ladder patterns 200F and 200R in the state of FIG. 12A are detected by the sensors 60F and 60R, respectively; the positional deviation amounts and the positional deviation correction amounts are calculated; and the positional deviation correction is performed (Steps S23 to S25). After this positional deviation correction, the positional deviation correction is performed with the inclination amount Δd still reflected, for example, as illustrated using the ladder patterns 200F and 200R in FIG. 12B.

In this case, while the positional deviations among the colors C, M, Y, and K are eliminated, the inclination amount Δd still remains. Therefore, if printing is performed in this state, the image is printed in a state of being inclined as a whole by the inclination amount Δd relative to the sheet 104. For that reason, it is necessary to turn back the inclination by the inclination amount Δd by further canceling the reflection of the inclination amount Δd given at Step S21 from the state of FIG. 12B in which the positional deviations are corrected. This cancellation of the reflection of the inclination amount Δd is a process of applying a negative inclination amount, that is, the inclination amount (−Δd), to the image data, and is in essence the same as the process of applying the inclination amount Δd to the image data. Therefore, the skew correction method described using FIG. 13 can be used in the same manner to cancel the reflected inclination amount Δd.

FIG. 12C illustrates, using the ladder patterns 200F and 200R, a state in which the inclination amount Δd has been canceled in this manner after the positional deviation correction. Thus, the image can be obtained with the positional deviations of the colors C, M, Y, and K being corrected in the state in which the inclination of the sensors 60F and 60R is eliminated.

Although the description above has been made of the case in which the first embodiment is applied to the electrophotographic image forming apparatus, the present invention is not limited to this example. The first embodiment is also applicable, for example, to a so-called ink-jet image forming apparatus that forms an image by discharging ink to a printing medium according to image data. In this case, the positional deviation correction patterns are formed, for example, on the printing medium.

Moreover, although in the description above, the image forming apparatus has the two sensors 60F and 60R and forms the two rows of positional deviation correction patterns, the present invention is not limited to this example. Specifically, the image forming apparatus may have three or more sensors and may form positional deviation correction patterns corresponding to each of the sensors. In this case, the inclination amount of the sensors may be obtained based on detection results of two of the three or more sensors, or may be obtained using detection results of all of the three sensors.

First Modification of First Embodiment

Figure 14A:
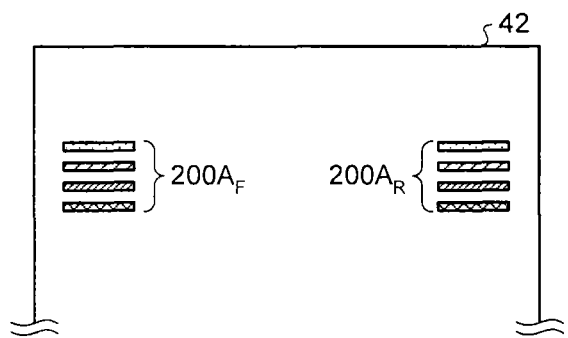
FIGS. 14A to 14C are schematic diagrams for explaining skew correction according to a first modification of the first embodiment.
Figure 14B:
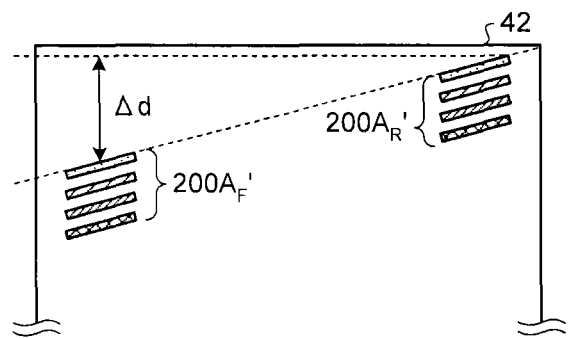

Next, a first modification of the first embodiment will be described. In the first embodiment described above, the skew correction using the access control to the line memory 40 is used to reflect the inclination amount Δd in the ladder patterns 200F and 200R. However, the present invention is not limited to this example. In the first modification of the first embodiment, the ladder patterns 200F and 200R inclined in advance by the inclination amount Δd are generated by the skew correction using image processing. Description will be made, using FIGS. 14A to 14C, of a method according to the first modification of the first embodiment, in which the ladder patterns 200F and 200R inclined in advance by the inclination amount Δd are generated using the image processing. Note that the horizontal direction of FIGS. 14A to 14C is assumed to be the direction of lines in the memory 42.

For example, according to a command of the control unit 30, the image processing unit 41 generates the normal ladder patterns 200F and 200R that do not reflect the inclination amount Δd, and writes them into the memory 42. FIG. 14A illustrates this state. In the example of FIG. 14A, a transverse line pattern $200A_F$ of the ladder pattern 200F and a transverse line pattern $200A_R$ of the ladder pattern 200R are written with the lines thereof coinciding with each other in the memory 42.

For example, at Step S21 in the flow chart of FIG. 9, the control unit 30 commands the image processing unit 41 to reflect the inclination amount Δd in the ladder patterns 200F and 200R. According to the command, the image processing unit 41 applies image processing to the ladder patterns 200F and 200R written in the memory 42. By this image processing, as illustrated in FIG. 14B, the positions of the ladder patterns 200 $A_F'$ and 200 $A_R'$ become different from each other by the inclination amount $\Delta d$ in the driving direction of the conveying belt 105, and the toner marks constituting the ladder patterns 200 $A_F'$ and 200 $A_R'$ are inclined corresponding to the inclination amount $\Delta d$.

Figure 14C:
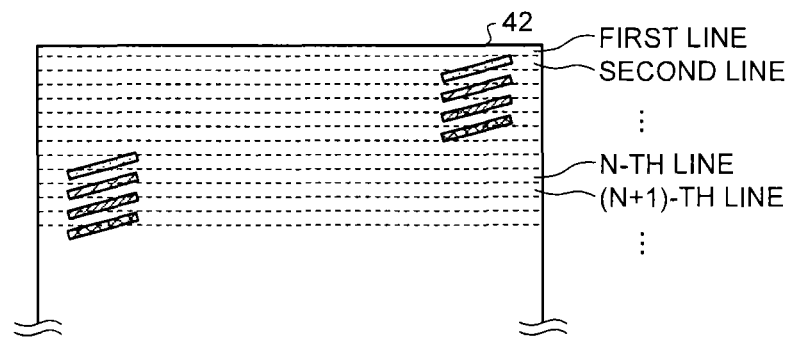

At Step S22 in FIG. 9, as illustrated in FIG. 14C, the image processing unit 41 reads out, from the memory 42, the image data in units of lines such as the first line, the second line, and so on, and sends them to the writing unit 39. The writing unit 39 stores the image data in the lime memory 40. The writing unit 39 reads out the image data in units of lines from the lime memory 40, and according to the read-out image data, controls lighting of the LEDA heads 114C, 114M, 114Y, and 114K. Thus, it is possible to form the ladder patterns 200F and 200R reflecting the inclination amount $\Delta d$. Note that the reflected inclination amount $\Delta d$ can also be canceled by the same method.

Although, here, the description has been made such that the image processing by the image processing unit 41 forms the ladder patterns 200F and 200R reflecting the inclination amount $\Delta d$, the present invention is not limited to this example. For example, the writing unit 39 may be provided with a memory and an image processing unit for image processing, and the inclination amount $\Delta d$ may be reflected in the image data of the ladder patterns 200F and 200R in the writing unit 39. Using this image processing unit, the writing unit 39 reflects the inclination amount $\Delta d$ in the image data of the ladder patterns 200F and 200R, and writes them into the line memory 40 in units of lines.

Second Modification of First Embodiment

In the first embodiment and the first modification of the first embodiment described above, the positional deviation correction patterns reflecting the inclination amount $\Delta d$ are formed by using the skew correction by the processing of the image data for forming the positional deviation correction patterns. In a second modification of the first embodiment, the positional deviation correction patterns reflecting the inclination $\Delta d$ are formed by using the skew correction performed by way of controlling the positions of exposure to the photosensitive drums 109C, 109M, 109Y, and 109K.

Figure 15A:
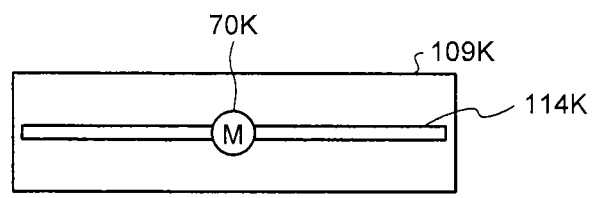
FIGS. 15A and 15B are schematic diagrams for explaining skew correction according to a second modification of the first embodiment.
Figure 15B:
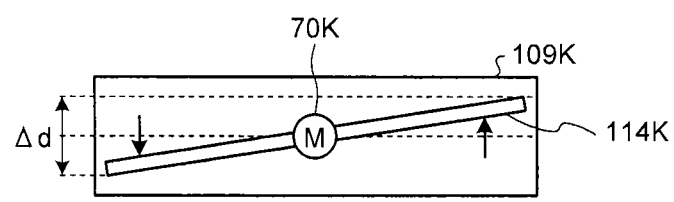

Description will be made, using FIGS. 15A and 15B, of a method for achieving the inclination by the inclination amount $\Delta d$ using the skew correction by way of controlling the exposure. In FIGS. 15A and 15B, the photosensitive drum 109K and the LEDA head 114K are illustrated as representatives because the same processing can be applied to each of the photosensitive drums 109C, 109M, 109Y, and 109K.

As illustrated in FIG. 15A, a rotary drive motor 70K is provided for the LEDA head 114K. As illustrated in FIG. 15B, by driving the rotary drive motor 70K corresponding to the inclination amount $\Delta d$, the LEDA head 114K is inclined corresponding to the inclination amount $\Delta d$ so as to expose the photosensitive drum 109K at an inclination of the inclination amount $\Delta d$ relative to the photosensitive drum 109K. With this method, the ladder patterns 200F and 200R reflecting the inclination amount $\Delta d$ can be formed. The reflected inclination amount $\Delta d$ can also be canceled by the same method.

Note that this method of inclining the angle of exposure to each of the photosensitive drums 109C, 109M, 109Y, and 109K by the inclination amount $\Delta d$ is also applicable to a case in which the exposure is performed, for example, a using laser scan unit (LSU) in which a laser beam is deflected by being reflected on a rotating polygon mirror and scans each of the photosensitive drums 109C, 109M, 109Y, and 109K in the main-scanning direction. In this case, the exposure to each of the photosensitive drums can be inclined by the inclination amount $\Delta d$ by changing, corresponding to the inclination amount $\Delta d$, the angle and direction of a reflection mirror used for projecting the laser beam reflected on the polygon mirror onto the photosensitive drum.

As described above, according to the first embodiment, the first modification of the first embodiment, and the second modification of the first embodiment, the positional deviation correction patterns are formed so as to reflect the inclination of the sensors, and the positional deviations of the colors are corrected based on the detection results obtained by detecting the positional deviation correction patterns with the sensors. Then, the final positional deviation correction results are obtained by canceling the inclination of the sensors from the positional deviation correction results. Therefore, it is possible to determine the distance (margin) of the part where the interrupt for storing the detection results in the memory is generated in each of the positional deviation correction patterns, without taking into account the inclination amount of the sensors. As a result, each of the positional deviation correction patterns can have a smaller overall length, and thus, the time required for the positional deviation correction processing can be reduced.

Second Embodiment

Next, a second embodiment of the present invention will be described. In the first embodiment described above, the description has been made of the example in which the image forming apparatus has the direct transfer system and forms the positional deviation correction patterns on the conveying belt 105. The second embodiment is an example of using an image forming apparatus having an intermediate transfer system in which each of the image forming units 106C, 106M, 106Y, and 106K transfers an image onto an intermediate transfer belt, and the image transferred onto the intermediate transfer belt is further transferred onto the sheet 104.

Figure 16:
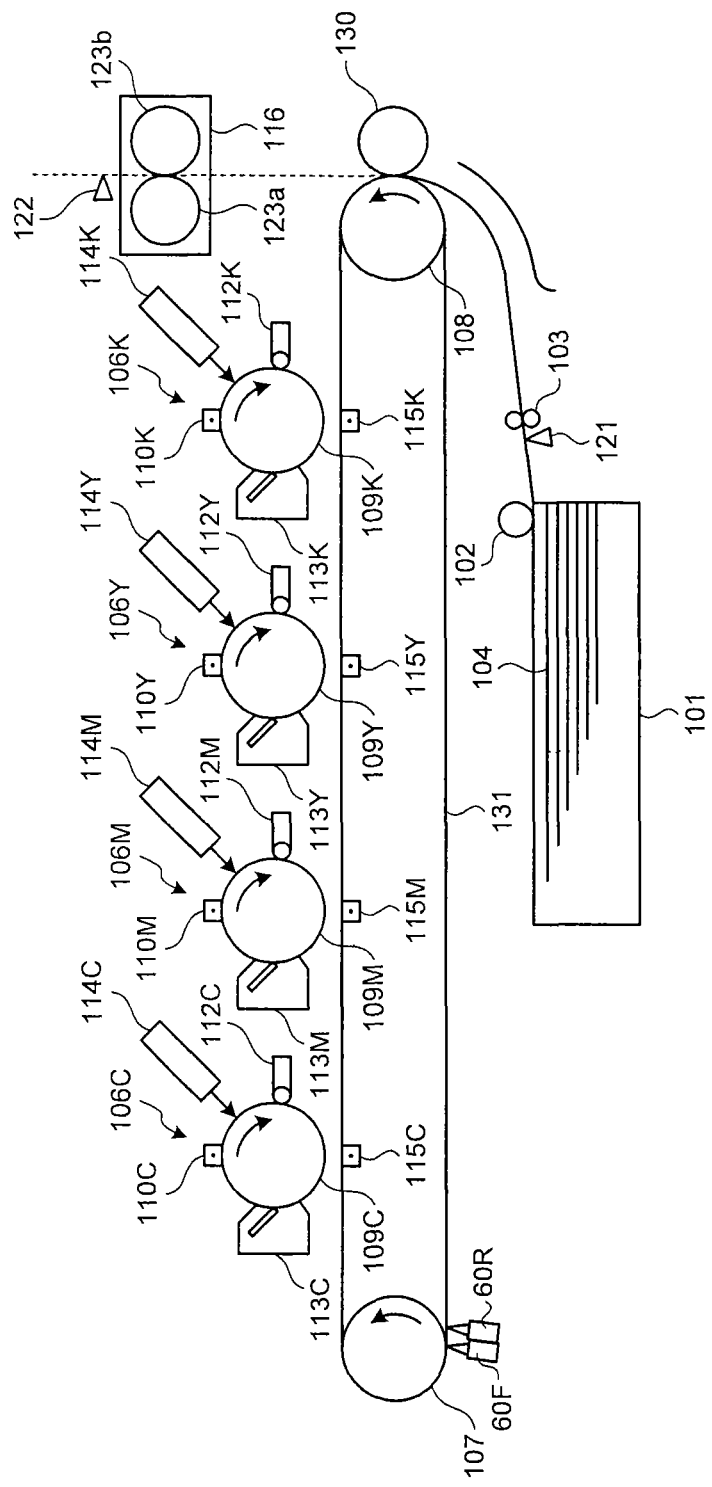
FIG. 16 is a schematic diagram illustrating a configuration of an example of an image forming apparatus according to a second embodiment of the present invention, with a focus on portions to perform image formation.

FIG. 16 illustrates a configuration of an example of the image forming apparatus according to the second embodiment, with a focus on portions to perform the image formation. Note that, in FIG. 16, the same numerals are given to the parts in common with those in FIG. 1 described above, and detailed description thereof will be omitted.

In the same manner as the above-described conveying belt 105, an intermediate transfer belt 131 is wound around the driving roller 107 and the driven roller 108, and is rotationally driven by a driving motor (not illustrated). The image forming units 106K, 106Y, 106M, and 106C are arranged in this order from the upstream side in the driving direction of the intermediate transfer belt 131. In the image forming units 106K, 106Y, 106M, and 106C, the toner images of the respective colors formed on the photosensitive drums 109K, 109Y, 109M, and 109C are transferred by the transfer units 115K, 115Y, 115M, and 115C so that the colors are overlapped with each other on the intermediate transfer belt 131.

The sheet 104 is taken out of the paper feed tray 101 by the paper feeding roller 102, then is fed out from the separation roller 103, and reaches a secondary transfer roller 130. The conveyance of the sheet 104 to the secondary transfer roller 130 is controlled so that the toner images transferred onto the intermediate transfer belt 131 are transferred (secondarily transferred) onto the sheet 104 by the secondary transfer roller 130. The toner images on the intermediate transfer belt 131 are transferred by the secondary transfer roller 130 onto the sheet 104, which in turn is fed out toward the fixing unit 116. When the sheet 104 has reached the fixing unit 116, the fixing roller 123a and the pressing roller 123b fix the toner images onto the sheet 104, which is then discharged.

The image forming apparatus according to the second embodiment forms the positional deviation correction patterns on the intermediate transfer belt 131 in order to correct the positional deviations of the formed image. In order to detect the positional deviation correction patterns formed on the intermediate transfer belt 131, the sensors 60F and 60R are provided on the downstream side, in the driving direction of the intermediate transfer belt 131, of the photosensitive drums 109C, 109M, 109Y, and 109K. For example, the sensors 60F and 60R are arranged as near as possible to the photosensitive drum 109C on the most downstream side in the driving direction of the intermediate transfer belt 131 so as to be capable of detecting the positional deviation correction patterns earlier.

The configuration described above using FIG. 2 can be used without change as a configuration for controlling the image forming apparatus according to the second embodiment. Therefore, description thereof will be omitted here.

In the image forming apparatus having the intermediate transfer system, the positional deviation correction patterns are formed on the intermediate transfer belt 131. The positional deviation correction patterns themselves, the processing of obtaining the sensor inclination, the processing of forming the positional deviation correction patterns, and the positional deviation correction processing based on the positional deviation correction patterns are the same as those of the first embodiment described above.

Specifically, in the processing of obtaining the inclination amount Δd of the sensors, the control unit 30 follows the flow chart of FIG. 6 as follows. After the inclination measurement by the sensors 60F and 60R is started at Step S10, the control unit 30 controls, at next Step S11, to form, on the intermediate transfer belt 131, the sensor inclination measurement patterns for measuring the sensor inclination. Then, at Step S12, the control unit 30 drives the intermediate transfer belt 131, and detects, with the sensors 60F and 60R, the sensor inclination measurement patterns formed on the intermediate transfer belt 131 at Step S11. At Step S13, the control unit 30 calculates the inclination amount of the sensors 60F and 60R based on the detection results, and stores the calculated inclination amount, for example, in the storage unit 35.

Also, in the processing of forming the positional deviation correction patterns and in the positional deviation correction processing based on the positional deviation correction patterns, the control unit 30 follows the flow chart of FIG. 9 as follows. After the positional deviation correction processing is started at Step S20, the control unit 30 reflects the inclination amount Δd of the sensors 60F and 60R in the positional deviation correction patterns, and forms the positional deviation correction patterns on the intermediate transfer belt 131 (Steps S21 and S22). At next Step S23, the sensors 60F and 60R detect the positional deviation correction patterns formed on the intermediate transfer belt 131 so as to reflect the inclination amount Δd. After predetermined sets of the inclination amount reflecting patterns are detected, the control unit 30 calculates, based on the detection results, the positional deviation amounts and the positional deviation correction amounts for correcting the positional deviation amounts at Step S24.

At next Step S25, the control unit 30 once performs calculation for performing the positional deviation correction processing based on the positional deviation correction amounts calculated at Step S24. Then, at next Step S26, the control unit 30 cancels the reflection of the inclination amount Δd from the calculation results obtained at Step S42. Specifically, the inclination amount Δd is inversely reflected into the calculation results obtained at Step S24 to obtain the final positional deviation correction amounts, and the positional deviation correction processing is completed (Step S27). Based on the final positional deviation correction amounts, the control unit 30 performs the skew correction using the skew correction function. Thus, the positional deviations of each of the colors can be corrected while eliminating the effects of the inclination of the sensors 60F and 60R.

As described above, the image forming apparatus having the intermediate transfer system can also perform the detection of the sensor inclination amount, the formation of the positional deviation correction patterns reflecting the sensor inclination amount, the positional deviation correction by the detection of the positional deviation correction patterns, and the cancellation of the reflection of the sensor inclination amount from the positional deviation correction results, in the same manner as in the case of the direct transfer system described in the first embodiment. Accordingly, it is possible to determine the distance (margin) of the part where the interrupt for storing the detection results in the memory is generated in each of the positional deviation correction patterns, without taking into account the inclination amount of the sensors. As a result, each of the positional deviation correction patterns can have a smaller overall length, and thus, the time required for the positional deviation correction processing can be reduced.

The present invention achieves an advantageous effect of performing positional deviation correction processing in a shorter time.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:
   a plurality of image formers configured to form a plurality of images having different colors from each other on an image forming medium driven at a predetermined speed in a manner aligning positions of the plurality of images having respective colors;
   at least two sensors configured to be arranged in a predetermined arrangement direction and detect the plurality of images formed on the image forming medium;
   an inclination amount calculator configured to calculate an inclination amount of the predetermined arrangement direction relative to a direction perpendicular to a direction of driving;
   a correction pattern former configured to form, using the plurality of image formers, two correction pattern rows in each of which one or a plurality of correction pattern images are arranged in a row in the driving direction, in positions corresponding to the at least two sensors on the image forming medium, so that the two correction pattern rows differ in position from each other by the inclination amount in the driving direction; and
   a positional deviation corrector configured to correct, while turning back an inclination by the inclination amount, positional deviations of the plurality of images having the respective colors formed on the image forming medium, based on detection results of the two correction pattern rows detected by the at least two sensors and based on the inclination amount,
   wherein turning back the inclination by the inclination amount corresponds to applying a negative inclination amount in an amount corresponding to the inclination amount to one of the two correction pattern rows.

2. The image forming apparatus according to claim 1, wherein the positional deviation corrector comprises:

a first correction value calculator configured to calculate first correction values for correcting image forming conditions of each of the plurality of image formers, by using the two correction pattern rows formed by the correction pattern former so as to differ in position from each other by the inclination amount in the driving direction; and a second correction value calculator configured to calculate second correction values obtained from the first correction values by turning back the inclination corresponding to the inclination amount; and the positional deviation corrector corrects the image forming conditions of each of the plurality of image formers, by using the second correction values calculated by the second correction value calculator.

3. The image forming apparatus according to claim 1, further comprising a line memory configured to store therein, in units of lines, image data used for forming the plurality of images by the plurality of image formers, wherein the correction pattern former forms the two correction patterns in position rows different from each other by the inclination amount in the driving direction, by accessing the line memory while shifting the lines corresponding to the inclination amount.

4. The image forming apparatus according to claim 1, wherein each of the plurality of image formers comprises an image processor that applies image processing to image data for forming the plurality of images; and the correction pattern former forms the two correction pattern rows in positions different from each other by the inclination amount in the driving direction, by deforming, corresponding to the inclination amount, the image data for forming the one or the plurality of correction pattern images in the plurality of image formers.

5. The image forming apparatus according to claim 1, wherein the correction pattern former forms the two correction pattern rows in positions different from each other by the inclination amount in the driving direction, by inclining the plurality of image formers corresponding to the inclination amount.

6. The image forming apparatus according to claim 1, wherein the inclination amount calculator forms single-colored measurement patterns on the image forming medium using one of the plurality of image formers, and calculates the inclination amount based on detection results of the single-colored measurement patterns detected by the at least two sensors.

7. The image forming apparatus according to claim 1, wherein the inclination amount calculator forms multi-colored measurement patterns on the image forming medium using all of the plurality of image formers, and calculates the inclination amount based on detection results of the multi-colored measurement patterns detected by the at least two sensors.

8. A method for controlling an image forming apparatus, the method comprising:

forming a plurality of images having different colors from each other on an image forming medium driven at a predetermined speed in a manner aligning positions of the plurality of images having respective colors;

calculating an inclination amount of an arrangement direction of at least two sensors that detect the plurality of images formed on the image forming medium relative to a direction perpendicular to a direction of driving;

forming two correction pattern rows in each of which one or a plurality of correction pattern images are arranged in a row in the driving direction in positions corresponding to the at least two sensors on the image forming medium, so that the two correction pattern rows differ in position from each other by the inclination amount in the driving direction; and correcting, while turning back an inclination by the inclination amount, positional deviations of the plurality of images having the respective colors formed on the image forming medium, based on detection results of the two correction pattern rows detected by the at least two sensors and based on the inclination amount, wherein turning back the inclination by the inclination amount corresponds to applying a negative inclination amount in an amount corresponding to the inclination amount to one of the two correction pattern rows.

9. The method for controlling the image forming apparatus according to claim 8, further comprising:

calculating first correction values for correcting image forming conditions of each of a plurality of image formers by using the two correction pattern rows so as to differ in position from each other by the inclination amount in the driving direction; and calculating second correction values obtained from the first correction values by turning back the inclination corresponding to the inclination amount; and correcting the image forming conditions of each of the plurality of image formers by using the second correction values.

10. The method for controlling the image forming apparatus according to claim 8, further comprising:

forming single-colored measurement patterns on the image forming medium; and calculating the inclination amount based on detection results of the single-colored measurement patterns detected by the at least two sensors.

11. An image forming apparatus comprising:

a plurality of image formers configured to form a plurality of images having different colors from each other on an image forming medium driven at a predetermined speed in a manner aligning positions of the plurality of images having respective colors;

at least two sensors configured to be arranged in a predetermined arrangement direction and detect the plurality of images formed on the image forming medium;

an inclination amount calculator configured to calculate an inclination amount of the predetermined arrangement direction relative to a direction perpendicular to a direction of driving;

a correction pattern former configured to form, using the plurality of image formers, two correction pattern rows in each of which one or a plurality of correction pattern images are arranged in a row in the driving direction, in positions corresponding to the at least two sensors on the image forming medium, so that the two correction pattern rows differ in position from each other by the inclination amount in the driving direction; and a positional deviation corrector configured to correct, while turning back an inclination by the inclination amount, positional deviations of the plurality of images having the respective colors formed on the image forming medium, based on detection results of the two correction pattern rows detected by the at least two sensors and based on the inclination amount, wherein the inclination amount calculator forms single-colored measurement patterns on the image forming medium using one of the plurality of image formers, and calculates the inclination amount based on detection results of the single-colored measurement patterns detected by the at least two sensors.

12. The image forming apparatus according to claim 11, wherein the positional deviation corrector comprises:

a first correction value calculator configured to calculate first correction values for correcting image forming conditions of each of the plurality of image formers, by using the two correction pattern rows formed by the correction pattern former so as to differ in position from each other by the inclination amount in the driving direction; and a second correction value calculator configured to calculate second correction values obtained from the first correction values by turning back the inclination corresponding to the inclination amount; and the positional deviation corrector corrects the image forming conditions of each of the plurality of image formers, by using the second correction values calculated by the second correction value calculator.

13. The image forming apparatus according to claim 11, wherein turning back the inclination by the inclination amount corresponds to applying a negative inclination amount in an amount corresponding to the inclination amount to one of the two correction pattern rows.

\* \* \* \* \*